May 6, 1969     E. A. J. MARCATILI     3,442,574
ELECTROMAGNETIC WAVE FOCUSER-DEFLECTOR
Filed Sept. 16, 1965
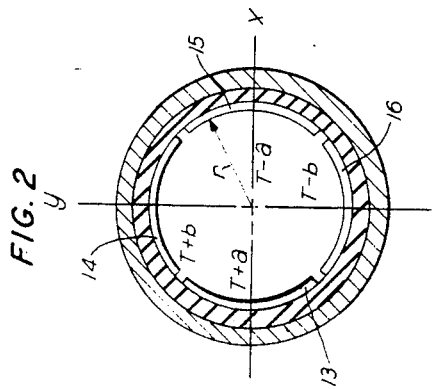
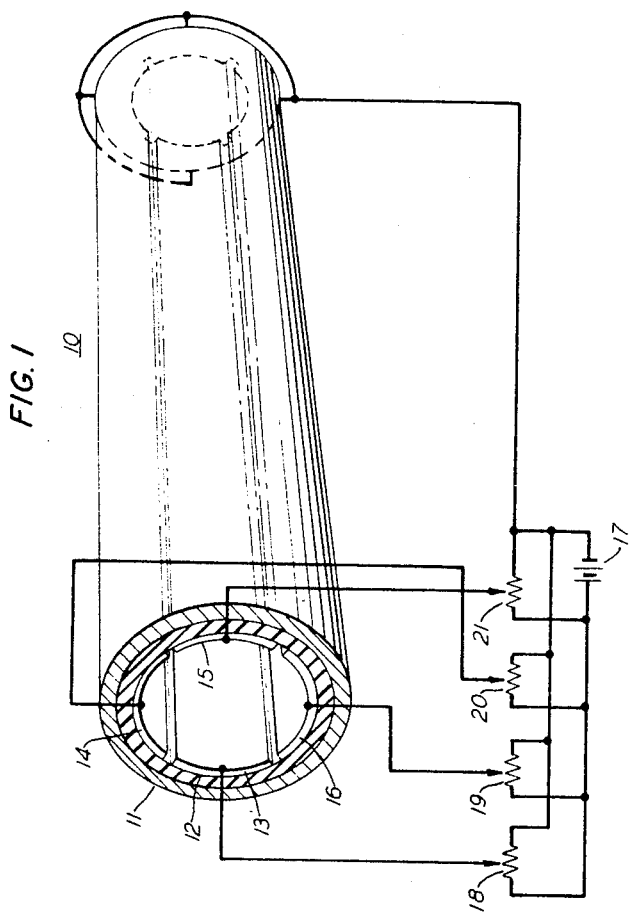
INVENTOR
E. A. J. MARCATILI
BY
ATTORNEY

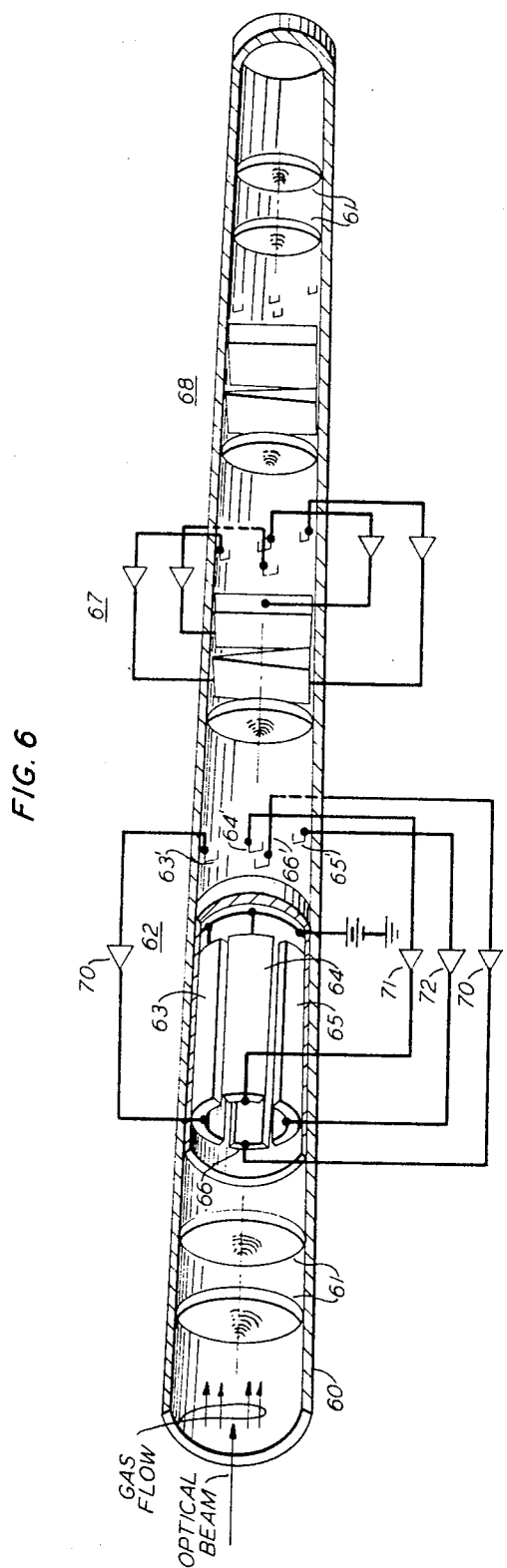

United States Patent Office 3,442,574
Patented May 6, 1969

3,442,574
ELECTROMAGNETIC WAVE FOCUSER-DEFLECTOR
Enrique A. J. Marcatili, Rumson, N.J., assignor to Bell Telephone Laboratories, Incorporated, New York, N.Y., a corporation of New York
Filed Sept. 16, 1965, Ser. No. 487,677
Int. Cl. B29d 1/06; G02b 7/02; G01j 1/20
U.S. Cl. 350—179                         11 Claims

ABSTRACT OF THE DISCLOSURE

By providing four, symmetrically located and independently adjustable density control elements about the periphery of a gaseous waveguide, an optical beam can be simultanously focused, and deflected along two mutually perpendicular directions. This provides a convenient means for making correction along the wavepath to overcome gravitational effects and lens aberrations. By means of a feedback arrangement, beam displacement corrections can be made automatically.

---

This invention relates to electromagnetic waveguiding systems and, in particular, to arrangements for simultaneously focusing and deflecting electromagnetic waves.

In an article by D. W. Berreman, entitled, "A Lens or Light Guide Using Convectively Distorted Thermal Gradients in Gases," published in the July 1964 issue of the Bell System Technical Journal, pp. 1469–1475, there is described a thermal gaseous waveguide particularly adapted for the transmission of optical wave energy. It is characteristic of the waveguide described by Berreman that a radially varying index of refraction is established across the wavepath by thermal means as a way of guiding the optical wave energy propagating therealong.

In United States Patent 3,400,993 there is described an alternate arrangement for obtaining the requisite radial variation in the refractive index by using a plurality of gases of different densities.

Such waveguiding systems, however, have certain practical operational limitations which have been recognized and which require rectification if these systems are to become commercially attractive. Included among these limitations are the effects of gravity upon the rotational symmetry of the gaseous lenses, aberrations in the gaseous lenses, and deviation of the optical beam from the guide axis due to misalignment of the optical waveguide resulting from both unintentional and intentional bends in the system. Various aspects of these problems have been considered and dealt with by others. See, for example, United States Patents 3,316,800 and 3,409,345.

In accordance with one aspect of the present invention, means are provided for introducing auxiliary density gradients in a gaseous waveguiding medium as a means for correcting any one, or all, of the above-mentioned limitations. This is accomplished by means of two pairs of density control elements disposed about the periphery of the waveguide. Each pair of control elements introduces a transverse density gradient in the waveguiding medium which can be resolved into two components. The first of these components is a radial density gradient which provides the primary waveguiding, or focusing action. The second, or auxiliary component, is superimposed upon the radial component and deflects the wave energy in a manner equivalent to a prism. Such apparatus, including two pairs of control elements, is thus the equivalent of a lens and two prisms. By orienting the two auxiliary gradients produced by the two pairs of control elements at right angles to each other, and by controlling the density distributions along these two orthogonal directions, waveguiding corrections can be introduced into the wavepath to compensate for gravitational effects, lens aberrations, guide misalignment, and other deleterious effects.

In one illustrative embodiment of the invention, four independently controlled heating elements are symmetrically disposed about the periphery of the wavepath. By suitably adjusting the temperature differentials among the four elements, the density gradients in the waveguiding medium can be so controlled as to focus the optical beam and simultaneously to deflect it along two orthogonal planes.

In a second illustrative embodiment of the invention, focusing and deflecting of the optical beam is accomplished by introduing into the wavepath varying amounts of a second gas of different density. The second gas is introduced through four separate porous surfaces uniformly distributed about the periphery of the wavepath.

Simultaneous focusing and deflecting of a beam of electromagnetic wave energy can also be achieved by means of a simple solid lens that has been transversely displaced relative to the beam axis. By providing suitable means for displacing such a lens in two orthogonal directions complete control over the direction of propagation of the wave energy can be realized.

In accordance with another aspect of the present invention, arrangements are disclosed for utilizing the above-described focuser-deflectors in a waveguiding system in conjunction with sensing detectors which monitor the direction of propagation of the electromagnetic wave energy and generate correcting signals which cause the wave energy to be redirected as required.

It is an advantage of the present invention that beam focusing and beam deflecting are accomplished by means of the same control elements.

It is a further advantage of the invention that the degree of beam deflection can be changed at relatively high speeds.

These and other objects and advantages, the nature of the present invention, and its various features, will appear more fully upon consideration of the various illustrative embodiments now to be described in detail in connection with the accompanying drawings, in which:

FIG. 1 is a first illustrative embodiment of a gaseous focuser-deflector in accordance with one aspect of the present invention;

FIG. 2 is a cross-sectional view of the focuser-deflector of FIG. 1 superimposed upon an x—y coordinate reference system;

FIG. 6 is a waveguiding system utilizing a plurality of the focuser-deflectors and optical sensing elements for redirecting an optical beam;

Figure 4:
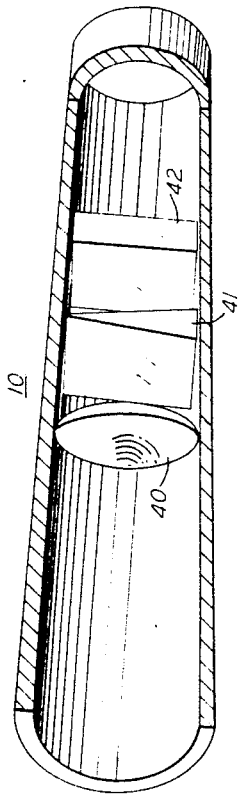
FIG. 4 is the optical equivalent of the focuser-deflector illustrated in FIG. 1.

Referring to the drawings, FIG. 1 is a first illustrative embodiment of a gaseous waveguiding component 10 incorporating simultaneous beam focusing and beam deflecting properties. Component 10 typically comprises an outer, protective cylindrical enclosure 11, and an inner insulating cylindrical sleeve 12. The latter is lined with four substantially identical heat control elements 13, 14, 15 and 16, each of which occupies slightly less than one-quarter of the periphery of the wavepath. In the illustrative embodiment of FIG. 1, the heat control elements are thin layers of an electro-resistive material deposited upon the inner surface of insulating sleeve 12. Each of the control elements is conductively and thermally insulated from the other elements and extends longitudinally along the wavepath in a direction parallel to the direction of wave propagation.

The temperature of each of the control elements is separately controlled by passing an electrical current through the element. The heat developed in the element raises its temperature to some prescribed level. This temperature can then be raised or lowered simply by changing the amplitude of the electrical current.

In the embodiment of FIG. 1, heating current is supplied to each of the control elements by a direct current source 17 through four potentiometers 18, 19, 20 and 21, all of which are connected in parallel with source 17. The adjustable arm of each potentiometer is connected to one end of one of the control elements. The other ends of the control elements are connected in common to one of the terminals of source 17.

Though not shown, means for introducing a gas into the system, and regulating its pressure and temperature, including filters, compressors, heating and/or cooling means, all of conventional form, are normally included in systems of the type contemplated. Such means are well known to those skilled in the art.

The operation of waveguiding component 10 is explained with reference to FIG. 2, which is a cross-sectional view of the device, superimposed upon an $x$—$y$ coordinate reference system. The path radius $r$ is indicated in FIG. 2, as are the temperatures $T+a$, $T+b$, $T-a$ and $T-b$ of the respective control elements 13, 14, 15 and 16.

Figure 3:
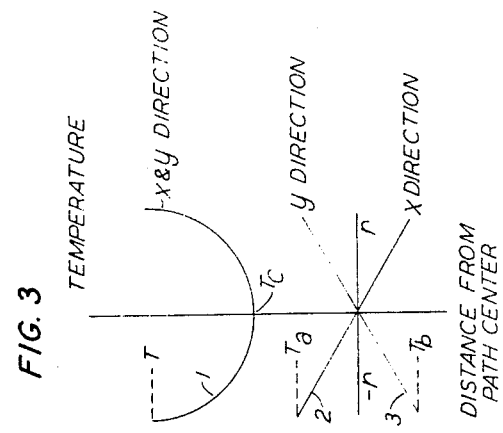
FIG. 3 shows the temperature gradients across the wavepath for different operating conditions.

In operation, gas at some low temperature, enters component 10 wherein it is heated as it flows therethrough. In particular, the gas immediately adjacent to the control elements are heated to a higher temperature than the gas at the center of the wavepath, thereby establishing a radial temperature gradient across the wavepath, and a corresponding density gradient. Assuming that the temperatures of all of the control elements are the same ($a=b=0$), the temperature gradient across the wavepath in all directions is also the same. Curve 1 of FIG. 3, in particular, is a graphical representation of the temperature gradient along both the $x$ and $y$ directions, as a function of distance from the center of the guide. As illustrated in FIG. 3, the temperature of the gas is a minimum $T_c$ at the guide center, and increases to a maximum $T$ at the outer periphery of the wavepath adjacent to the control elements. As is indicated in the above-cited article by Berreman, this type of temperature gradient acts upon the electromagnetic wave propagating therethrough as a positive, or converging, lens.

If a slight temperature differential is established between control elements 13 and 15 such that the temperature of element 13 is raised to a higher temperature $T+a$, and that of element 15 is lowered to a lower temperature $T-a$, an additional temperature gradient is established across the wavepath along the $x$ direction. The temperature $T_c$ at the center of the wavepath remains unaffected. However, the gas temperature adjacent to element 13 rises slightly, whereas the gas temperature adjacent to element 15 is lowered slightly. This temperature differential is separately illustrated graphically by curve 2 of FIG. 3, which shows a continuously decreasing temperature gradient along the $x$ direction. This temperature gradient acts independently upon the electromagnetic wave as a prism, deflecting the wave toward the cooler control element 15 (in the $+x$ direction).

Similarly, a temperature differential $\pm b$ between control elements 14 and 16 results in a continuously rising temperature gradient along the $y$ direction as illustrated by curve 3 in FIG. 3. The effect of this is to deflect the wave towards the cooler element 16 (in the $-y$ direction).

Thus, it is apparent that the structure illustrated in FIG. 1 is the equivalent of a lens and a pair of prisms, which together are capable of simultaneously focusing an electromagnetic beam and independently deflecting it in two orthogonally oriented directions. This equivalence is illustrated in FIG. 4 which shows component 10 as comprising a lens 40 and two orthogonally oriented prisms 41 and 42. It is also apparent that, depending upon the relative temperatures of the control elements and the gas, lens 40 can be either a converging lens or a diverging lens, and that depending upon the temperature differentials produced in the control elements, deflection of the beam can be produced in either the $+x$ or $-x$ direction, and in either the $+y$ or $-y$ direction. The arrangement of FIG. 1 thus gives complete control over the wave energy propagating therethrough.

By making the control elements of thin sheets or films, they have very low heat storage capacity, and are therefore capable of responding rapidly to changes in control current. Furthermore, by varying the thickness of the films, the temperature differential along the direction of propagation can be controlled in any prescribed manner. For example, as noted in the above-mentioned copending application by Marcuse and Steier, to operate properly, a gaseous waveguide requires a fair degree of circular symmetry. However, gravitational effects tend to distort this symmetry by deforming the lines of constant density. It is well known that in a fluid environment containing fluids of different density, convection currents are created when the heavier fluid settles, forcing the lighter fluids to rise. This effect is evident in gaseous waveguiding devices, as the difference in density between different gases, or between the same gas at different temperatures, produces convection currents which distort the symmetry of the devices.

In accordance with the present invention, counter flowing convection currents are induced in order to minimize the normal convection currents which would be set up in a converging gas lens as the heavier gas in the center of the wavepath starts to settle to the bottom of the waveguiding structure. To counter this tendency, the temperature of the lower control element 16 is made slightly higher than the temperature of the upper control element 14. This produces a tendency for a counterflowing convection current which offsets the normal convection current. Alternatively, the results produced can be explained by considering the effect upon the beam produced by these two opposing phenomena. Stated briefly, the gravitational effect tends to deflect the beam downward, whereas the temperature differential between elements 14 and 16 tend to deflect the beam upward.

Because the gravitational effect is minimum at the input end of the lens, and gradually becomes more severe as the radial temperature gradient within the gas becomes more pronounced, it is apparent that the degree of correction should correspondingly be minimum at the input end of the lens and greatest at the output end of the lens. This can be readily achieved by tapering the thickness of the control elements in the manner illustrated in FIG. 5, which is a longitudinal cross-sectional view of the waveguiding component 10 of FIG. 1, modified in a manner to be described.

Figure 5:
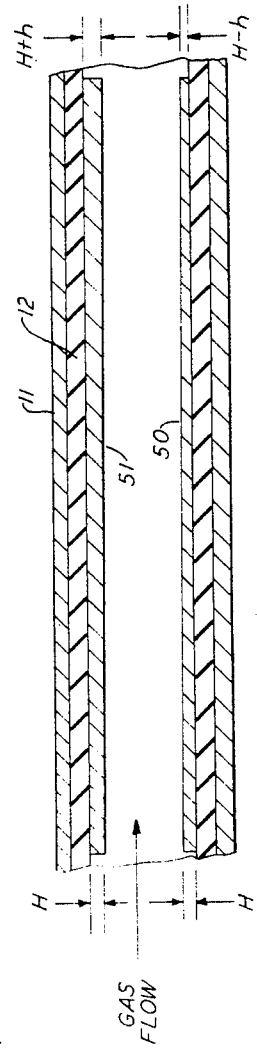
FIG. 5 is a modification of the embodiment of FIG. 1 wherein the temperature gradient across the wavepath varies in the longitudinal direction.

FIG. 5 shows the outer enclosure 11, sleeve 12, and the cross sections of two of the control elements 50 and 51. Assuming a gas flow in the direction from left to right, the thickness of the control element 50 tapers from a maximum thickness H at the left (input end) to a minimum thickness $H-h$ at the right (output end). Since the resistivity of the control element and, hence, the amount of heat generated therein, varies as a function of its thickness, the temperature gradient along element 50 varies from a temperature T, at its input end to a higher temperature $T+t$ at its output end. Control element 51, on the other hand, tapers from its minimum thickness H, at the input end, to its maximum $H+h$ at the output end, producing a temperature gradient which varies from temperature T at the input end to a lower temperature $T-t$ at the output end. The temperature differential between elements 50 and 51 is, thus, zero at the input end and $2t$ at the output end.

Uniform tapering is obviously only one way of controlling the temperature of a control element as a function of longitudinal position along the wavepath. Other, more complicated variations can be obtained by more complicated tapering. Alternatively, the resistivity of the element can be varied in an element of uniform thickness by controlling its chemical composition.

In another application of the invention, the direction of propagation of the wave energy is monitored, and means provided for minimizing any deviation of the direction of propagation from the desired direction. To illustrate such an arrangement, a typical optical waveguiding system is illustrated in FIG. 6. The system comprises an elongated enclosure 60 within which a gas flow is established by suitable means well known in the art.

Distributed along the wavepath at suitable intervals is a plurality of simple gaseous thermal lenses, represented symbolically by the lenses 61. These may be lenses of the type described, for example, by Berreman in his above-identified article or, more generally, they may be any other type of lens known in the art.

If the lenses are perfect, and if the wavepath is perfectly aligned, an optical beam projected into the system propagates along the axis $z-z$ of the wavepath. However, due to imperfections in the system, there is a tendency for the beam to deviate from the desired path, requiring controlled redirection of the beam at regular intervals. This is accomplished by the inclusion, at regular intervals along the waveguiding system, of a plurality of focuser-deflectors in accordance with the present invention. In FIG. 6 one of the focuser-deflector units 62 is illustrated pictorially as comprising the four control elements 63, 64, 65 and 66, associated with a system of four beam-sensing photodetectors 63', 64', 65' and 66', symmetrically distributed about the wavepath. The other units 67 and 68 are shown symbolically as a lens and two, crossed prisms, as represented in FIG. 4. In all of the units, each of the beam-sensing detectors is aligned with, and controls the heating current supplied to one of the control elements. Thus, in unit 62 the vertically aligned photodetectors 63' and 65' control the currents applied to the vertically aligned control elements 63 and 65, respectively, whereas the horizontally aligned photodetectors 64' and 66' control the currents applied to the horizontally aligned control elements 64 and 66, respectively.

Typically the photodetectors (which can be either photodiodes, photoresistor or solar batteries, for example), are coupled to their respective control elements through current amplifiers. In FIG. 6, amplifiers 70, 71, 72 and 73, shown in block diagram, are associated with focuser-deflector unit 62.

When the beam is centered, all of the photodetectors are equally illuminated and the currents supplied to all the control elements are the same. In this condition, only simple focusing action is produced in each of the focuser-deflectors. If, on the other hand, the beam is misdirected and off center, the photodetectors are unequally illuminated and the currents supplied to the several control elements are correspondingly different. For example, if the beam passing through unit 62 is misdirected downward, detector 65' received more illumination and the upper detector 63' receives less illumination. Consequently, more current is supplied to control element 63. This produces a temperature differential in the vertical direction which deflects the beam upwards, tending to correct for the downward misdirection of the beam. Similarly, if the beam is misdirected sideways, this is sensed by photodetectors 64' and 66' and a temperature differential is produced in the horizontal direction, tending to correct for the sideways misdirection of the beam. This process is repeated in each of the units 62, 67 and 68.

While three focuser-deflectors are shown in FIG. 6, it is understood that fewer or more such units can be utilized as required by the system. In addition, more sophisticated control arrangements can be employed, also depending upon the requirements of the system.

In FIG. 6, the monitoring photodetectors are located behind the focuser-deflector unit they control. That is, the photodetectors associated with any specific unit respond to the optical beam after it has passed through that specific focuser-deflector unit and feeds back a correcting signal. An alternative arrangement is illustrated symbolically in FIG. 7. In this arrangement, the photodetector sensing elements are located before the focuser-deflector units they control. That is, the photodetectors associated with a particular focuser-deflector unit sense the optical beam before it passes through that focuser-deflector unit, and feeds ahead a correcting signal. Thus, in FIG. 7, photodetectors 75' see the optical beam before it passes through unit 75. Similarly, photodetectors 76', 77' and 78' see the optical beam before it passes through units 76, 77 and 78, respectively. (In this illustration, only one pair of photodetectors and only one prism is shown for each unit, it being understood that, in each instance, a second pair of photodetectors and corresponding control elements would also be provided to correct for beam deviations in the orthogonal direction.)

If it is assumed that the misdirection of the beam is due to unintentional undulations in the waveguiding system, it can be shown that the uncorrected displacement of the center of the beam off the guide axis at the $n^{th}$ lens is proportional to $nL^2/R$, where L is the spacing between lenses, n the number of lenses through which the beam has passed, and R is a Fourier component descriptive of the undulations of the wavepath selected to represent the worst condition.

Figure 7:
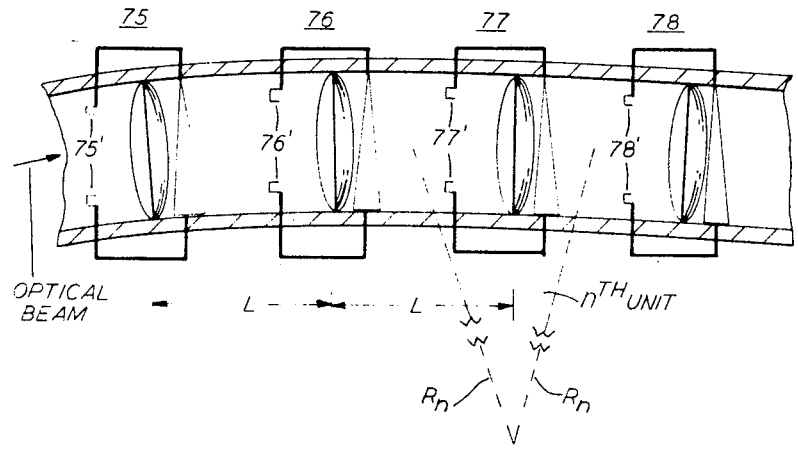
FIG. 7 is a modification of the arrangement of FIG. 6 wherein the optical sensing units precede the focuser-deflector units.

With the sensing photodetectors located before the correcting units, as in FIG. 7, the displacement of the beam from the center of the wavepath $r_n$ following the $n^{th}$ lens is given by $L^2/R_{n-1}$, where $R_{n-1}$ is the radius of curvature of the waveguide at the preceding $(n-1)$ lens. It will be noted that with correction, the beam displacement does not grow in proportion to n, the number of lenses, as it would if the redirectors were not used. This system, however, requires that the amplifiers connecting the photodetectors to the control units be capable of maintaining the displacement at the $n+1^{th}$ lens, introduced by the redirector in the $n^{th}$ lens, equal to minus the displacement of the beam at the $n-1^{th}$ lens.

With the sensing photodetectors located after the correcting units, as in FIG. 6, the displacement $r_n$ of the beam at the $n^{th}$ lens is given by $L^2/BR_{n-1}$, where B is the proportionality constant of the amplifiers connecting the sensing photodetectors to the control element. In the preceding arrangement of FIG. 7, the amplitude of this proportionality constant was 1. In the instant arrangement, on the other hand, B is advantageously made large compared to unity.

It is thus apparent that for the particular conditions assumed, the displacement of the beam is less in the arrangement of FIG. 6 than it is in the arrangement of FIG. 7 by the factor B. The situation changes, however, if the system is adapted to propagate wave energy in opposite directions simultaneously. This gives rise to additional possible arrangement which include monitoring both oppositely propagating beams and attempting to correct simultaneously for both. Analysis shows, however, that the overall results are poorer when this double correction is attempted. The best overall results are achieved when the arrangement of FIG. 7 is employed to correct only one of the beams. While only one beam is actively monitored, the result is to incidentally provide an acceptable correction for the other, oppositely propagating, beam.

It should be understood that the above discussion is merely illustrative of the advantages of providing deflection control in gaseous lenses. The results obtained hereinabove are limited to the particular system and conditions considered. Obviously, if the cause of the beam misdirection is different, the optimum arrangement of sensing photodetectors will, in general, differ from that described above.

In the discussion above, thermal means are employed to produce the desired density gradients in the waveguiding gas. Alternately, the requisite density gradients can be produced by varying the relative amount of a second gas being supplied in a two-gas system.

In United States Patent 3,400,993 there is described a gaseous waveguiding system in which a second gas is added about the outer periphery of a flowing first gas which has a different density. By virtue of the phenomenon of diffusion, the second gas gradually penetrates into the first gas, thus producing a radially varying index of refraction across the wavepath.

In accordance with another illustrative embodiment of the present invention, a second gas is supplied to the system from four separate, and independently controlled sources. In this manner, the amount of second gas supplied at various locations about the periphery of the wavepath can be controlled in a manner to introduce auxiliary density gradients across the wavepath.

Figure 8:
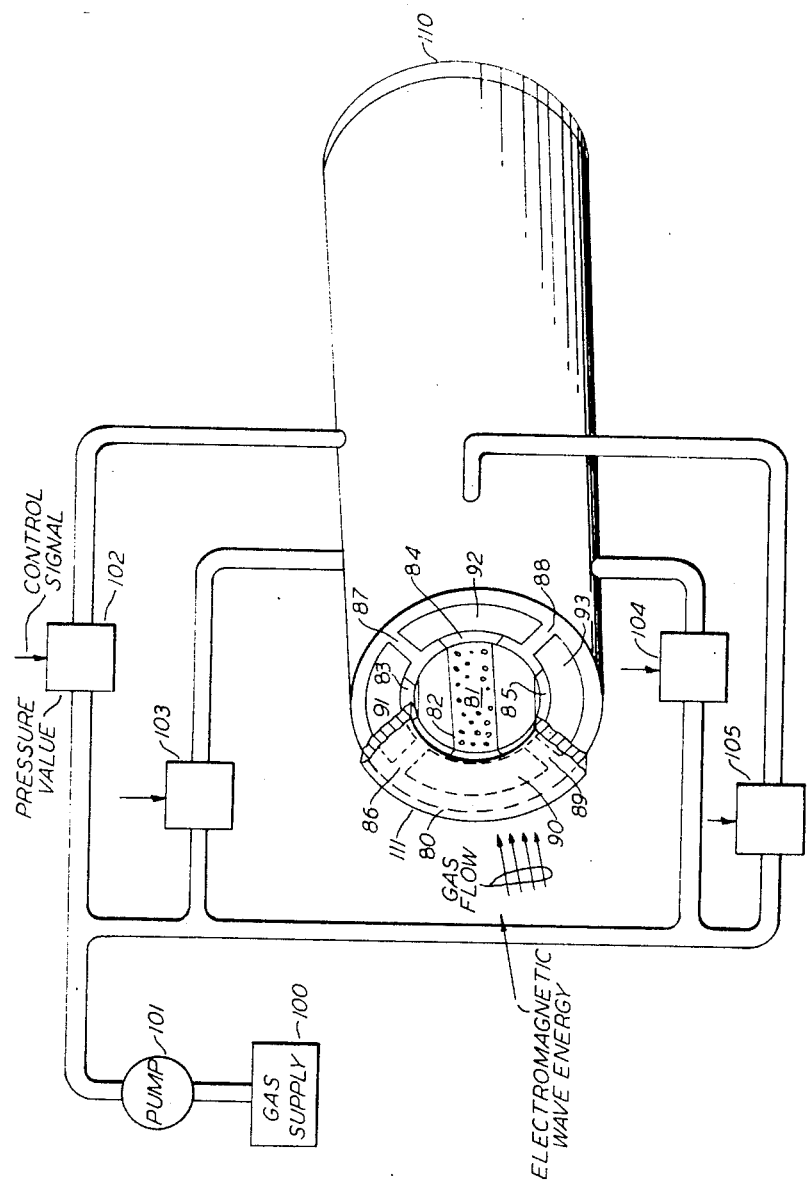
FIG. 8 is an embodiment of the invention utilizing a second gas to produce a density gradient across the wavepath.

FIG. 8 shows a two-gas focuser-deflector comprising a pair of elongated coaxial cylinders 80 and 81. The outer cylinder 80 is made of a material that is substantially impervious to the particular gas contained between cylinders 80 and 81. Cylinder 81, on the other hand, includes four substantially equal longitudinally extending porous segments 82, 83, 84 and 85 uniformly distributed about cylinder 81. The region between cylinders 80 and 81 is sealed off at each end by means of annular rings 110 and 111, and is partitioned into four equal compartments 90, 91, 92 and 93 by means of dividers 86, 87, 88 and 89. Each compartment is associated with one of the porous segments such that gas within said compartment can enter into cylinder 81 through one, and only one, of the porous segments. The dividers, in addition to forming the four compartments, support cylinder 81 within cylinder 80.

Gas is supplied to each of the compartments from a common gas supply 100 by means of a gas pump 101. The pressure of the gas in each of the compartments, however, is separately and independently controlled by means of separate pressure control valves 102, 103, 104 and 105. The pressure can be manually adjusted or, if used in conjunction with some sort of monitoring arrangement as shown in FIG. 6 and FIG. 7, the pressure values are controlled by an electrical or mechanical control signal.

In operation the embodiment of FIG. 8 is similar to the embodiment of FIG. 1. As explained in the above-mentioned copending application by A. C. Beck et al., focusing action is obtained by adding a second gas of different density about the outer periphery of a first gas flowing along the wavepath. Thus, if the pressures in all of the compartments are the same, simple focusing in accordance with the prior art is obtained. If, however, the pressures in the several compartments are not the same, the amount of second gas supplied to the first gas flow is different about the periphery of the wavepath. This results in an auxiliary density gradient across the wavepath and a consequential deflection in the direction of propagation of the wave energy within the wavepath. As in the embodiment of FIG. 1, deflection is produced independently, along two mutually perpendicular directions.

Figure 9:
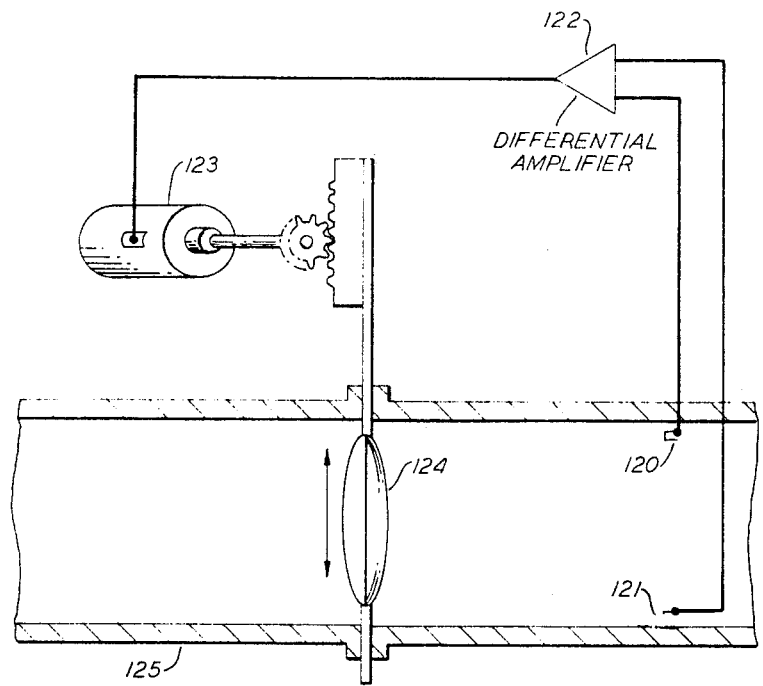
FIG. 9 is a waveguiding system using a solid lens focuser-deflector arrangement.

In the discussion relating to FIGS. 6 and 7, redirection of the wave energy is accomplished by means of a gaseous focuser-deflector. It should be understood, however, that other types of redirectors can be used. For example, a solid lens, transversely displaced relative to the beam axis, is also the equivalent of a lens and a prism in that it both focuses and deflects the beam. Thus, in a direction-monitored system, the monitoring sensors can be used to position a solid lens in the waveguide, as illustrated in FIG. 9. In this figure, the signals produced in the sensing elements 120 and 121 are coupled into a differential amplifier 122, the output from which is used to drive a motor 123. Depending upon which of the sensing elements is more intensely illuminated, the motor rotates in a direction to displace the center of lens 124 vertically, either above or below the center of the waveguiding enclosure 125. A similar pair of sensing elements (not shown) and a second differential amplifier and motor arrangement (also not shown) would be included to displace the lens in the horizontal direction. Thus, insofar as the results produced, the solid lens arrangement of FIG. 9 is the equivalent of the gaseous lens arrangement of FIG. 6, and could be used in lieu of the gaseous lens or in conjunction with it. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. A gaseous waveguide for guiding electromagnetic wave energy comprising:
   a hollow elongated enclosure wherein said wave energy propagates;
   a longitudinally flowing gas within said enclosure;
   first and second independently controlled means disposed on diametrically opposite sides of said enclosure for producing a density gradient across said gas along a first direction;
   and third and fourth independently controlled means disposed on diametrically opposite sides of said enclosure for independently producing a density gradient across said gas along a second direction normal to said first direction.

2. The waveguide according to claim 1 wherein said first and second means produce temperature gradients across said gas.

3. The waveguide according to claim 1 wherein said first and second means introduce a second gas into said waveguide.

4. A gaseous beam focuser-deflector for guiding electromagnetic wave energy comprising:
   a hollow cylindrical enclosure wherein said wave energy propagates;
   a gas flowing within said enclosure;
   four heat control elements symmetrically distributed about the inner surface of said cylinder and extending longitudinally therealong;
   said elements being thermally insulated from each other and from said enclosure;
   and means for separately controlling the temperature of each of said elements and thereby controlling the temperature distribution across said flowing gas.

5. The focuser-deflector according to claim 4 wherein each of said elements comprises a layer of electroresistive material, and wherein means are provided for passing an independently controlled electrical current through each of said elements.

6. In a gaseous transmission system adapted to transmit a beam of optical wave energy;
   a plurality of gaseous beam focuser-deflector units longitudinally distributed along said system;
   each of said units comprising means for establishing a radial density gradient across a gas flowing through said units for focusing said beam and for independently establishing auxiliary density gradients across said gas along two orthogonal directions for independently deflecting said beam in said two directions;

and sensing means associated with each of said units for sensing any misdirection in the direction of propagation of said beam and for controlling the auxiliary density gradients in said respective units in response thereto.

7. The system according to claim 6 wherein said sensing means are located after the respective focuser-deflector units with which they are associated.

8. The system according to claim 6 wherein said sensing means are located before the respective focuser-deflector units with which they are associated.

9. The system according to claim 6 where optical beams are transmitted simultaneously in opposite directions, and wherein said sensing means monitor only one of said beams.

10. A gaseous electromagnetic beam focuser-deflector comprising:
   a pair of hollow coaxial cylinders;
   means for partitioning a portion of the region between said cylinders into four equal compartments;
   said compartments being distributed symmetrically about the inner of said cylinders and extending coextensively along said inner cylinder;
   means for separately supplying a first gas having a first refractive index to each of said four compartments;
   a second gas, having a second refractive index higher than said first refractive index, flowing along said inner cylinder wherein said beam propagates;
   characterized in that:
   the inner cylinder is porous to said first gas but impervious to said second gas;
   and in that means are provided for independently varying the pressure of said first gas within each of said compartments and, thereby, controlling the rate at which said first gas passes into said inner cylinder.

11. A gaseous electromagnetic beam focuser-deflector comprising:
   a hollow, elongated enclosure in which said beam propagates;
   said enclosure containing therein a first flowing transparent gas having a first refractive index;
   means symmetrically disposed around said enclosure for introducing a second transparent gas into the outer periphery of said first flowing gas from four separate sources;
   said second gas having a lower refractive index than said first gas;
   and means for independently controlling the amount of said second gas introduced into said enclosure by said sources.

References Cited

UNITED STATES PATENTS

| | | |
|---|---|---|
| 2,836,652 | 5/1958 | Sprague. |
| 2,949,816 | 8/1960 | Weaver. |
| 3,316,800 | 5/1967 | Kibler _____ 250—201 X |

OTHER REFERENCES

Eaglesfield et al.: "Mode-Conversion Loss in a Sequential Confocal Lens System," Proceedings of the IEE, vol. III, No. 3, March 1964, pp. 610–615.

JOHN K. CORBIN, *Primary Examiner.*

U.S. Cl. X.R.

250—203; 350—247